March 6, 1928.   1,661,458
R. E. BAUS
METHOD OF LOADING AUTOMOBILE BODIES IN FREIGHT CARS
Filed May 2, 1925   3 Sheets-Sheet 1
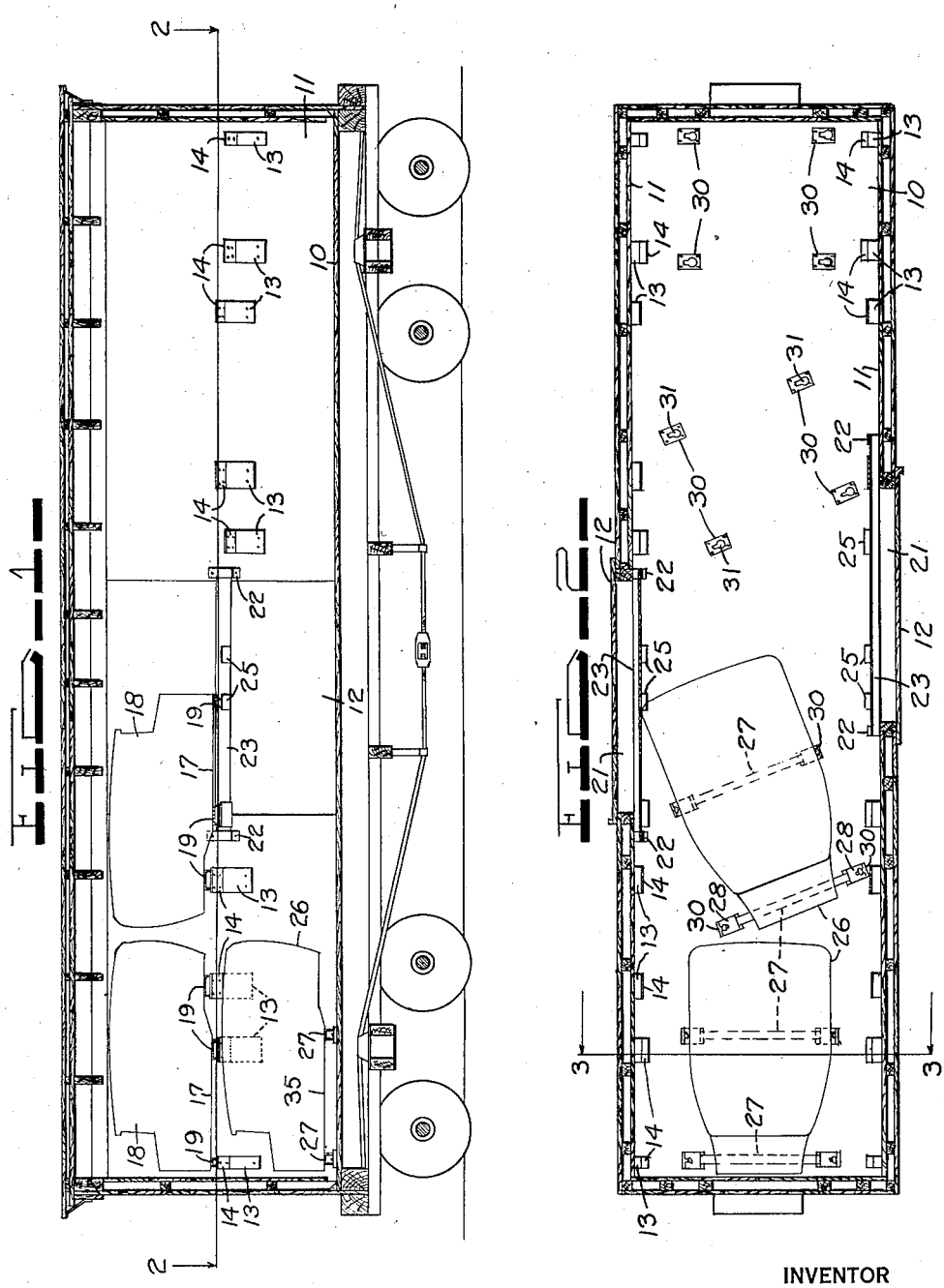
INVENTOR
RICHARD E. BAUS
BY
ATTORNEY March 6, 1928. 1,661,458
R. E. BAUS
METHOD OF LOADING AUTOMOBILE BODIES IN FREIGHT CARS
Filed May 2, 1925 3 Sheets-Sheet 2
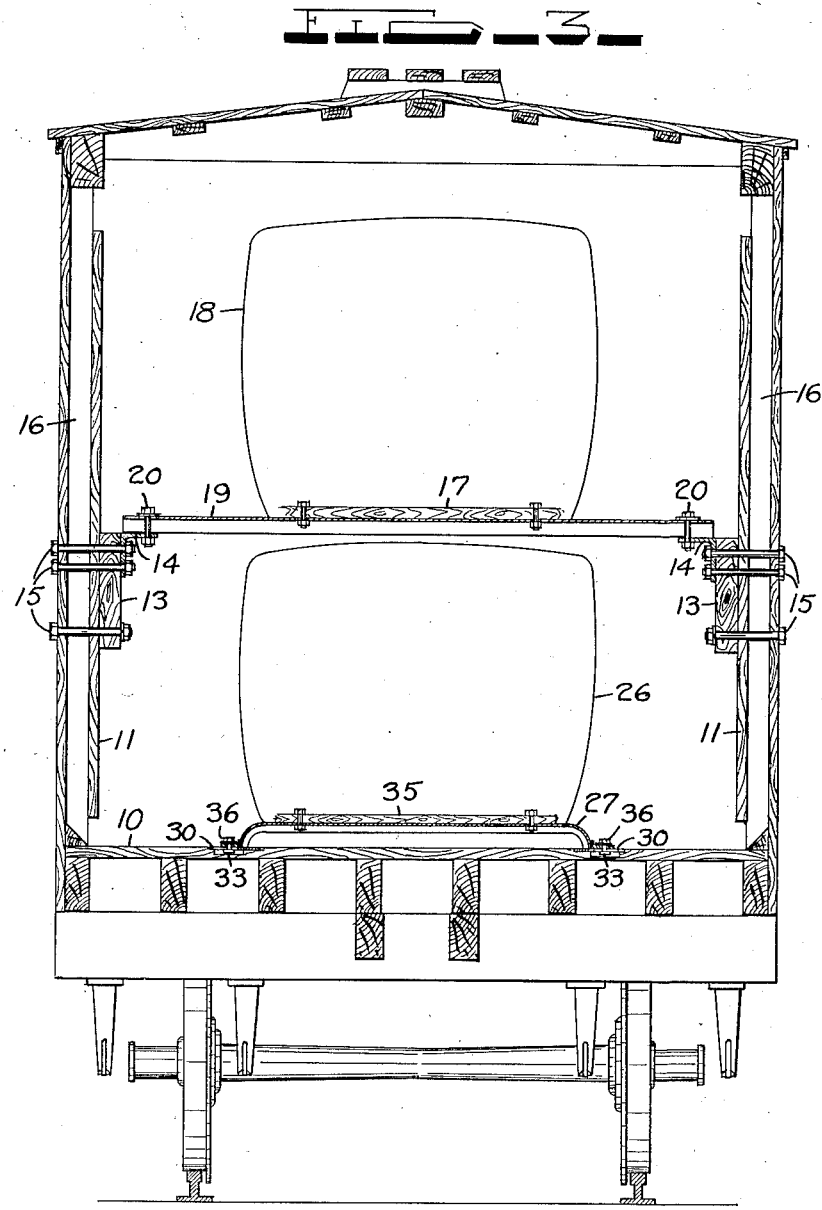
INVENTOR
RICHARD E. BAUS
BY
ATTORNEY March 6, 1928. 1,661,458
R. E. BAUS
METHOD OF LOADING AUTOMOBILE BODIES IN FREIGHT CARS
Filed May 2, 1925 3 Sheets-Sheet 3
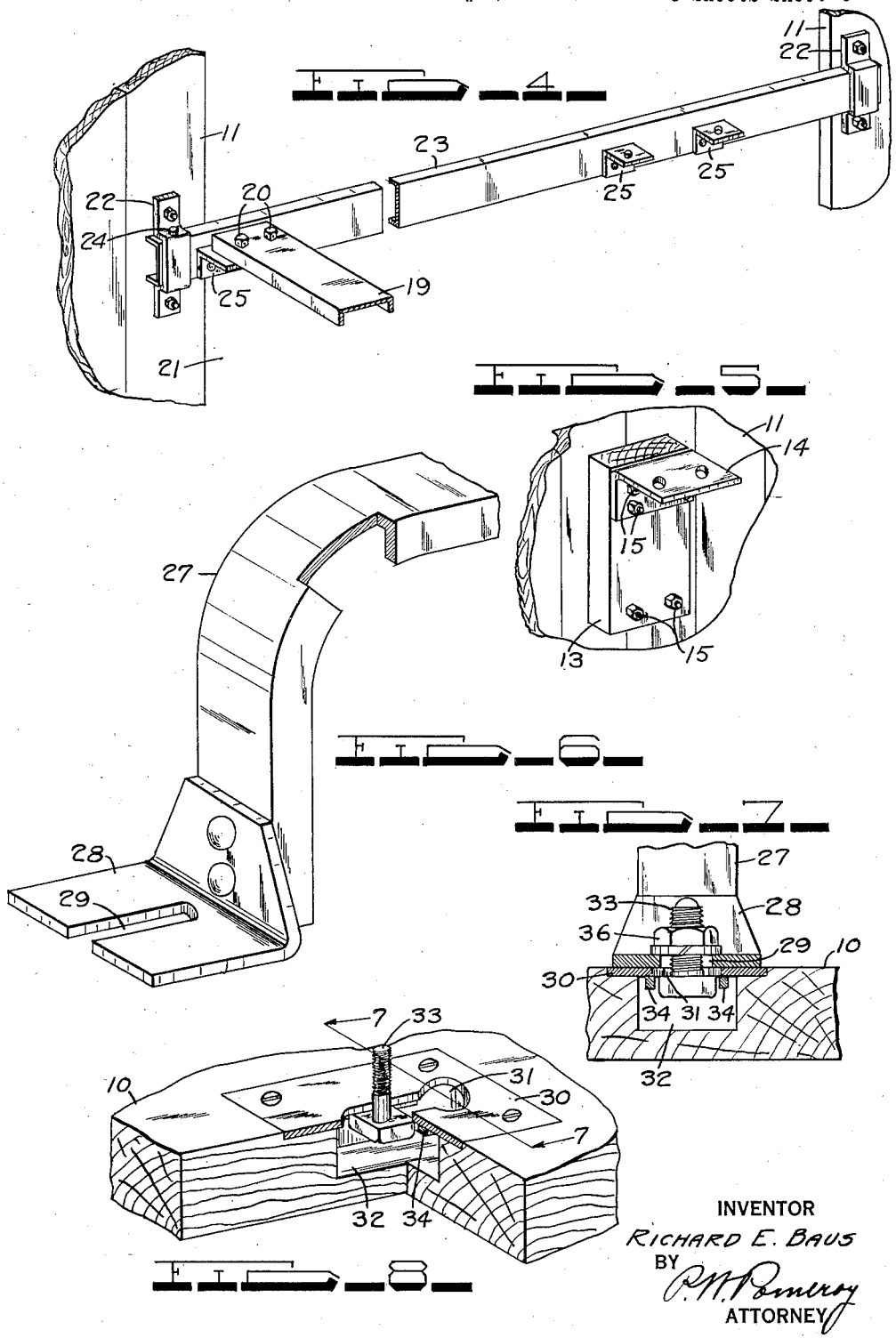
INVENTOR
RICHARD E. BAUS
BY
P. M. Pomeroy
ATTORNEY Patented Mar. 6, 1928.

1,661,458

UNITED STATES PATENT OFFICE.

RICHARD E. BAUS, OF DETROIT, MICHIGAN, ASSIGNOR TO THE STUDEBAKER CORPORATION, OF SOUTH BEND, INDIANA, A CORPORATION OF NEW JERSEY.

METHOD OF LOADING AUTOMOBILE BODIES IN FREIGHT CARS.

Application filed May 2, 1925. Serial No. 27,518.

This invention relates to the shipping of automobile bodies in freight cars and has for its object the providing of a simple, economical and novel means whereby a relatively large number of such bodies may be shipped in a single car and may be placed therein and removed therefrom with relative ease and speed.

Another object is to provide a means for double decking automobile bodies in freight cars for shipment in which the upper bodies are supported from the sides of the car and the lower bodies are supported on the floor of the car.

Another object is to provide means for supporting the upper tier or deck of a double deck load of automobile bodies which comprises the securing of brackets to the sides of the freight car at a substantial distance above the floor and securing cross members of slightly shorter length than the inside width of the freight car to the sill of the bodies, and thereafter lifting the bodies and cross-members up as a unit and positioning them in such position that the ends of the cross-members rest on and are supported on the brackets where they are removably secured.

Another object is to provide cross-members secured to the sills of the bodies and slotted plates on the floor of the freight car whereby bolts may be removably positioned in said slotted plates to engage and secure said cross-members thereto.

A further object is to provide cross-members secured to the sills of an automobile body, which cross-members are bow shaped so as to allow a loading truck to pass therebeneath, and slotted plates secured to the freight car floor at an angle to the length of the car, whereby a body may be moved on a truck through the door of the freight car to a position over said slotted plates, the truck dropped and removed, and bolts passed through said slotted plates and the ends of said cross-members and secure said body as a unit to said floor.

The above being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, and in which like numerals refer to like parts throughout the several different views, Figure 1 is a vertical section taken longitudinally of a freight car just inside the near side of the same, showing in a more or less diagrammatic fashion automobile bodies therein supported and secured in accordance with the present invention.

Figure 2 is a horizontal sectional view of the freight car taken on the line 2—2 of Figure 1, a body being shown in a position adjacent the freight car door which was not not shown in Figure 1 because it would tend to confuse that drawing.

Figure 3 is an enlarged vertical sectional view taken on the line 3—3 of Figure 2.

Figure 4 is a perspective view of the means used to support a body in the upper tier in line with one of the freight car doors.

Figure 5 is a perspective view of one of the supporting brackets for the upper tier of bodies, shown secured in position on the side wall of the freight car.

Figure 6 is a perspective view of one end of one of the supporting cross-members for the lower tier of bodies.

Figure 7 is a fragmentary vertical sectional view taken on the line 7—7 of Figure 8 and transversely through the large end of the slot in the slotted plate used to secure the cross-members of the lower tier of bodies to the floor.

Figure 8 is a fragmentary perspective view of one of the slotted plates used to secure the cross members of the lower tier of bodies to the floor of the freight cars, shown in position on the floor of the freight car.

In the drawings is illustrated a freight or box car having a floor 10, sides 11 and doors 12, in which the present invention is employed to ship automobile bodies. As best shown in Figures 3 and 5 I secure to the sides 11, brackets comprising a block 13 and an angle-member 14. These parts are secured to the sides 11 by means of bolts 15 which extend through the block 13 and side 11, the upper bolts 15 also passing through the depending leg of the angle-member 14 thereby to secure it in position with the block 13. The horizontal leg of the angle-member 14 provides a horizontal supporting and attaching flange as will presently be described. Although the block 13 may be extended down into contact with the floor 10, in most cases I have found this unnecessary, particularly where the body is not extremely heavy and the brackets are placed in line with the vertically extending studs 16. These brackets are placed in line with each other on the opposite sides of the inside of the car and with their upper surfaces at a height above the floor greater than the height of the bodies to be shipped therebelow. To the underside of the sill or sill cross-members 17 (Figure 3) of each body 18 which is to be supported on these brackets are secured two or more cross-members 19, three of which are employed for each body in the accompanying drawings. These cross-members, as shown, are of channel-iron with the open side of the channel facing downwardly, and each is of sufficient length to substantially span the width of the inside of the freight car and rest against the upper horizontal face of the angle-member 14, and they are spaced along the under side of the body in accordance with the spacing of the brackets on the side of the car so that each cross-member will engage its respective brackets.

In practice these cross-members 19 are bolted to the under side of the body 18 as shown, being so spaced that the bolts pass through the openings provided for subsequently bolting the body 18 to its chassis. The body 18 and cross-members 19 are placed as a unit on a suitable elevating platform, the platform is rolled into the freight car, the platform is raised until the body and cross-members are above the upper face of the angle member 14, the platform is manipulated to bring the cross-members 19 directly above the angle-members 14, the platform is lowered until the ends of the cross-members 19 rest on the angle-members 14, and then bolts 20 are passed through the overlapping portion of the cross-members 19 and angle-members 14, after which the platform is removed. To unload these operations are reversed as will be plainly apparent. As will also be apparent, such loading of a freight car is begun at a point farthest from the door after which other bodies are loaded in a similar manner nearer the door.

Inasmuch as there is no side wall in the door openings 21 to support the brackets, I provide special means for supporting the bodies 18 in line with such openings. This means, as best shown in Figure 4, comprises a strap-member 22 secured to the inside face of the side 11 on each side of the door openings 21 at a height corresponding to the the height of the blocks 13. Removably supported by each pair of strap-members 22 on the same side of the car is a channel-member 23 which extends between and is received in the strap-members 22, and when in operation is held from accidental disengagement therewith by means of a bolt or pin 24 (Figure 4) which passes through one end of the channel-member 23 and its corresponding strap-member 22. Suitable angle-members 25, corresponding to the angle-members 14, are secured to the channel-member 23 in proper spaced relation, the angle-members 25 serving the same purpose as the angle-members 14 previously described. After the bodies 18 have been loaded up to the point of the door opening 21, the channel-members 23 are inserted in the strap-members 22, the pin 24 is dropped in place, and a body 18 is loaded as previously described.

The lower tier or deck of bodies, which for the sake of clearness is indicated as 26, is loaded in somewhat the same manner but the method of supporting them is different than that for the upper deck. In the lower deck two cross-members 27 of a different shape and shorter than the cross-members 19 are employed for each body 26 and are secured directly to the floor 10. These cross-members 27 are of channel section and the ends are bent downwardly to form bow-shaped ends to elevate the body 26 from the floor 10, and to the down-turned ends are secured an angle-shaped foot 28 having a horizontal face provided with a slot 29 (Figure 6). Set into the floor 10 in a position to match the respective feet 28 of the cross-members 27 are metal plates 30, each of which is provided with a centrally located key-hole shaped slot 31 (Figures 2, 7 and 8) beneath which a recess 32 is provided in the floor 10. The enlarged part of the slot 31 is of a size sufficient to allow the head of a bolt 33 to pass therethrough into the recess 32, after which the bolt 33 may be slid up into the narrow portion of the slot to thereby prevent it from being withdrawn from the slot. Guides such as 34 are secured to the under side of each plate 30 adjacent the narrow portion of the slot 31 to engage the head of the bolt 33 and hold the same against turning. In practice, the cross-members 27 are bolted to the sill or sill cross-member 35 of a body 26 as previously described in connection with the bodies in the upper tier or deck, a low-lift truck is positioned beneath the cross-members 27 and the body 26 and cross-members are raised as a unit, rolled into the freight car, dropped in position over the plates 30, bolts 33 inserted into the slots 31 and moved into the narrow portion thereof, being at the same time slipped into the slots 29 in the feet 28, and nuts 36 are threaded home on the bolts 33; thereby securing the feet 28 to the floor 10, after which the truck is removed.

In order to facilitate the loading and unloading of the bodies 26 as much as possible, I prefer to place those immediately adjacent the doors 12 at an angle to the length of the freight car as shown in Figure 2, thereby requiring the least time possible in manipulating the loading truck to place the bodies in securing position or to remove them therefrom.

While the above described method and apparatus will be found to be of the greatest value where the same cars are used continuously for the shipping of such bodies, in which case the brackets on the walls 11 and the plates 30 may be left in position at all times, nevertheless it will be found that even where the freight cars are not so used continuously, and consequently where the brackets must be removed after each shipment, particularly if the feet 28 are replaced by ones of a different type that may be nailed or spiked to the floor 10, a substantial saving in time and labor results as well as a substantial reduction in the amount of material necessary to secure the bodies in place.

Formal changes may be made in the specific embodiment of the invention described without departing from the spirit and substance of the broad invention, the scope of which is commensurate with the appended claims.

What I claim is:—

1. The method of double-deck loading automobile bodies in freight cars for shipment, comprising securing brackets to the sides of said cars at a substantial height above the floor thereof, securing cross-members to said bodies, placing said bodies and their respective cross-members as a unit in said car with the cross-members of certain of said bodies supported on said brackets and the cross-members of other of said bodies supported on said floor.

2. The method of double-deck loading automobile bodies in freight cars for shipment, comprising securing brackets to the sides of said car substantially midway between the floor and roof thereof, securing cross-members to said bodies, placing a row of said bodies with their attached cross-members in said car with said cross-members spanning the width of said car between said brackets and supported by and secured to said brackets, and thereafter placing a row of said bodies with their attached cross-members on the floor of said car beneath said first mentioned row and securing the cross members of said last mentioned row of bodies to said floor.

3. Means for double-decking automobile bodies in a freight car comprising brackets secured to the sides of said car substantially midway between the roof and floor thereof, supporting members for one of said automobile bodies bridging said brackets across the width of said car, supporting-members for a second automobile body resting on and secured to the floor of said car beneath said first body, and means for securing said automobile bodies to said supporting members in superimposed position in said freight car.

4. In a freight car having a door opening, means for supporting an automobile body therein comprising straps secured to the side of said car on each side of said opening, a bar spanning said opening and removably supported by said straps, brackets on said straps, and cross-members supporting said body bridging the interior width of said car and supported by said brackets.

5. The method of double-decking automobile bodies in a freight car in line with the doors thereof, comprising removably securing bars to said car across the opening for said doors above the level of the floor, spanning the interior width of said freight car by supporting members supported on said bars, securing a body to said cross members, and thereafter securing another body to said floor below the body supported on said cross members.

6. The method of loading automobile bodies in a freight car for shipment, comprising securing cross members to said bodies, and thereafter placing said bodies with their respective cross members as units in said car, certain of said cross members being secured to the sides of said car above the floor thereof, and other of said cross members being secured directly to said floor.

7. The method of loading automobile bodies in freight cars, comprising securing a plurality of supporting members, independent of the automobile, to the under side of each body, moving each of said bodies with its respective supporting members as a unit into said car, and thereafter securing certain of said supporting members against movement at a point above the floor of said car and others of said supporting members to the floor of said car below said bodies first secured therein.

8. The method of double-decking automobile bodies in freight cars for shipment, comprising securing substantially straight supporting members to certain of said bodies and moving each of said certain of said bodies as a unit with its respective supporting members into said car and securing the ends of said supporting members to brackets secured to the sides of said car above the floor thereof, securing downwardly bent supporting members to others of said bodies and moving each of said others of said bodies as a unit with its respective supporting members into said car to a position beneath said bodies secured above said floor, and thereafter securing the ends of said downwardly bent supporting members to the floor of said car.

9. The method of loading automobile bodies in freight cars, comprising securing a plurality of cross members to the under side of each body, moving each body with its respective cross members, as a unit, into said car, securing the ends of certain of said cross members to the side of said car above the floor thereof, and securing the ends of other of said cross members directly to said floor, said cross members being so formed so as to permit the insertion of a lifting truck therebeneath when in loaded position.

Signed by me at Detroit, Michigan, U.S.A., this 29th day of April, 1925.

RICHARD E. BAUS.